United States Patent [19]
Oram

[11] 3,832,539
[45] Aug. 27, 1974

[54] MULTI-BEAM LIGHTING DEVICE

[76] Inventor: John Anderson Oram, Osborne Cottage, Heath Rd., Leighton Buzzard, Bedfordshire, England

[22] Filed: May 11, 1973

[21] Appl. No.: 359,374

Related U.S. Application Data

[63] Continuation of Ser. No. 185,493, Oct. 1, 1971, abandoned.

[30] Foreign Application Priority Data

Oct. 7, 1970 Great Britain.................... 47754/70
Dec. 15, 1970 Great Britain.................... 59566/70

[52] U.S. Cl............... 240/41.3, 240/1 LP, 240/1.4, 240/41.15, 350/290, 350/315
[51] Int. Cl............................................. F21v 13/04
[58] Field of Search........... 240/41.35 A, 41.3, 41.1, 240/41.15, 46.59, 1.4; 353/82

[56] References Cited
UNITED STATES PATENTS

| | | | |
|---|---|---|---|
| 2,191,379 | 2/1940 | Glasgow | 240/41.1 X |
| 3,247,367 | 4/1966 | Rayces | 240/41.3 |
| 3,387,128 | 6/1968 | Benard | 240/41.3 |
| 3,540,805 | 11/1970 | Mortensen | 240/41.3 X |

*Primary Examiner*—Richard L. Moses
*Attorney, Agent, or Firm*—Sughrue, Rothwell, Mion, Zinn & Macpeak

[57] ABSTRACT

A lighting device comprises an elliptical reflector with a holder for locating a lamp with its filament at one of the foci of the reflector. A beam splitting device in the form of two planar mirrors is arranged between the reflector and its other focus to reflect two beams of light from the lamp transversely of the axis of the reflector in opposite directions. Two optical systems comprising concave mirrors and converging lenses are located in the paths of the two beams respectively to reflect the beams so that they meet at an acute angle to one another and to form focussed images of the lamp filament at the place where the beams meet.

27 Claims, 7 Drawing Figures

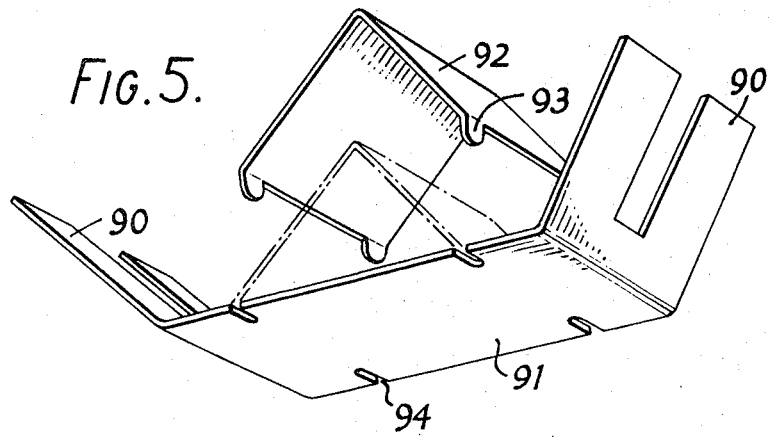
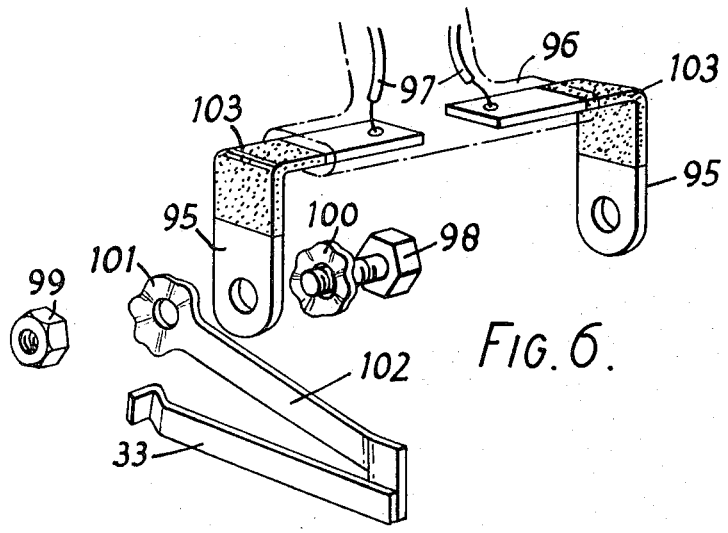

MULTI-BEAM LIGHTING DEVICE

This application is a continuation of Ser. No. 185,493 filed Oct. 1, 1971 and now abandoned.

The present invention relates to lighting devices which provide an illuminated working area with reduced shadows by means of two converging beams of light.

According to the present invention a lighting device comprises a substantially elliptical reflector with a holder for locating a light source at one of the foci of the reflector, and a beam splitting device so arranged between the reflector and its other focus that, in use, with a lighted lamp in the holder, the light from the lamp is split into two beams, two optical systems being located in the paths of the two beams respectively to reflect the beams so that they meet at an acute angle to one another and to form focussed images of the lamp filament in a plane where the beams overlap. Each optical system preferably comprises a concaved mirror and a converging lens. As overlapping images of the filament are thus formed where the beams meet, there is an area of intense illumination with reduced shadows.

In applications where it is necessary to ensure a sharp cut off in illumination, such as in dentistry where the light must not fall on the patient's eyes, gates may be located in the paths of the beams at positions such that they will form focussed images at or near the place where the beams meet. There are two virtual positions of the other focus of the reflector formed by the beam splitting device. Focussed images of the filament are formed at the two virtual positions of the other focus and it is here that the two gates are located. By providing the gates with slots the same size as the image of the filament a sharp cut-off of illumination at the place where the beams meet can be produced with little reduction in brightness.

When using the lamp in dentistry it is particularly useful to be able to vary the colour of the light to assist in matching false teeth with natural teeth. For this purpose a filter may be arranged in one of the beam paths which alters the colour and/or the intensity of the light in the beam (including polarising filters). The filter may be mounted for movement across the beam path so that progressive movement of the filter causes more of the filter to lie in the beam. Preferably the leading edge of such a filter is oblique to the direction of movement. Where each optical system comprises a concave mirror and a converging lens, the filter may be located between one of the mirror and the corresponding lens.

In one form of the invention is addition to a filter between one of the mirrors and the corresponding lens two wedge-shaped filters are mounted for sliding movement in guides in front of the lenses of the optical systems. The spacing of the leading edges of the two filters is equal to the spacing of the axes of the lenses.

Preferably the lighting device is used with a halogen lamp. The lamp filament is usually elongate in a transverse direction so that the beams are usually flat. In some applications it is preferable that the beams approach one another with the acute angle between the flat sides of the beams, in other applications it is preferable that the beams approach one another with the acute angle between the edges of the beams. For example, in dentistry, some dentists prefer the first arrangement which provides illumination of the lower teeth from above and the upper teeth from below. Other dentists prefer the second arrangement which provides good illumination of the teeth at the sides. In the first arrangement the filament extends transversely to the axis of the reflector and is normal to the plane of the beam paths. The gates are in the form of slots which have their longitudinal axes normal to the plane of the beam paths. In the second arrangement the filament lies in the plane of the beam paths and the gates are in the form of slots with their longitudinal axes in the plane of the beam paths.

A lamp assembly suitable for use with a lighting device as described above comprises a lamp mounted on a tube of insulating material so as to extend transversely from it, the terminals of the lamp being connected to two pins which are also mounted on the tube and extend transversely from it in the same direction as the lamp.

It has been found that plastics impregnated card such as is used for the cores of transformer windings is a suitable insulating material for the tube.

The lamp assembly is primarily designed for use with a lighting device as described above in which the lamp holder is in the form of two sockets arranged to receive two pins. A spring may be provided for each pin to engage the pin and hold it in the socket. Each pin can have a groove running round its axial surface, which cooperates with the corresponding spring so to hold the pin in the socket with an abutment surface around the base of the pin up against an abutment surface around the end of the socket. By arranging the filament of the lamp at the appropriate predetermined position relative to the abutment surfaces surrounding the base of the pins, the filament will be located at the focus of the elliptical reflector when the pins are located in the sockets.

Thus the lamp assembly can readily be replaced when the lamp fails. The insulating tube enables the assembly to be held in the bare hand immediately after failure. The filament of a replacement lamp assembly is located in the required position when the pins of the lamp assembly are fully inserted in their sockets.

In another aspect the present invention provides a two-beam lighting device having a replaceable lamp assembly comprising a support with a lamp extending from it and two pins electrically connected to the terminals of the lamp and extending from the support in the same direction as the lamp, the pins eing located in sockets of the lighting device and the support providing a handle which is thermally insulated from the lamp. Thus the lamp assembly can be removed from the lighting device with a bare hand when the lamp is hot.

An embodiment of the invention will now be described by way of example, with reference to the accompanying drawings of which:

FIG. 5 shows an alternative form of gate and beam-splitting mirrors, and

FIG. 6 shows an alternative form of stirrup.

A lighting device in a housing 11 is mounted on an adjustable column 12 by means of a stirrup 13. Such an adjustable column is described in my British Pat. No. 1,251,833. There is sufficient friction in the pivotal connections between the stirrup and the lighting device to allow the setting of the pitch of the lighting device to be accurately adjusted.

Figure 2:
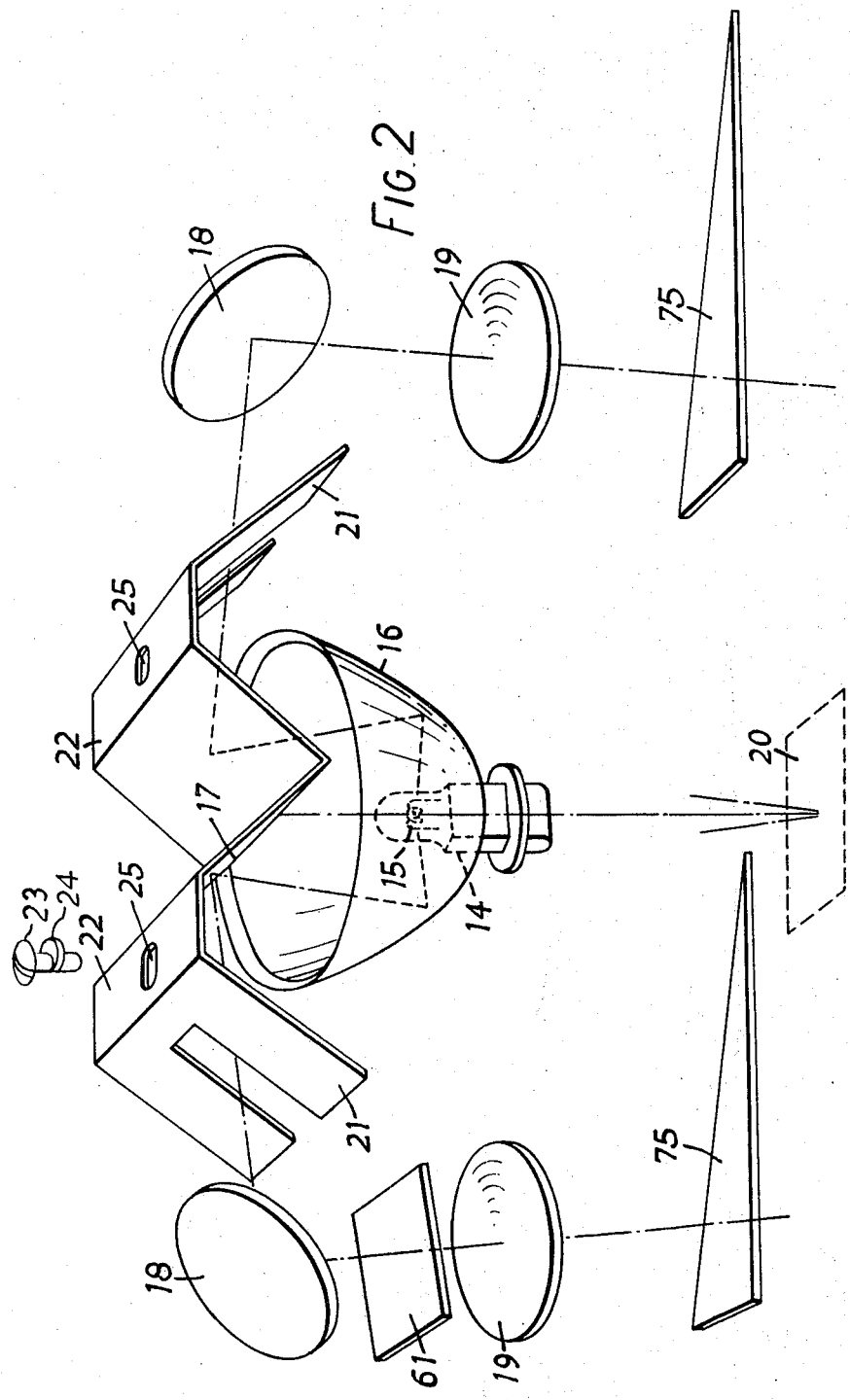
FIG. 2 shows a diagrammatic perspective view of the optical parts of the lighting device of FIG. 1.

As is best seen in FIG. 2, the optical parts of the lighting device comprise a 10.5 volt tungsten halogen lamp 14 mounted with its filament 15 at one of the foci of an elliptical dichroic reflector 16. Between the reflector 16 and its other focus there is a beam-splitting device in the form of two planar reflecting surfaces 17. The surfaces 17 are arranged symmetrically about the plane that is normal to the longitudinal axis of the filament and passes through the axis of the reflector 16, each surface making an angle of 40° with the reflector axis. Thus, when the lamp is lit, the light from the reflector is split into two beams which pass transversely of the reflector axis in opposite directions. Focussed images of the filament 15 are formed at the two apparent positions of the said other focus of the reflector.

The two beams strike two concave mirrors 18 where they are reflected through angles of about 79°. The reflected beams pass through two convex lens 19 and meet at an angle of about 14° at a place 30" in front of the lighting device. The curvature of the mirrors 18 and the focal length of the lenses 19 are such that there are two overlapping focussed images 20 of the filament 15 at the place where the beams meet.

The mirrors 18 are each made from a standard lens blank worked to a spectacle lens concave radius and then surface aluminised. The lenses 19 are also spectacle lenses. They may be crossed lenses to reduce distortion.

As the filament 15 is elongate the images 20 are also elongate and overlap to provide a strip of illumination approximately 2½ wide. In some applications the images are arranged to be completely in register with one another, in others the overlap is only partial so as to produce a fall off in intensity of illumintion towards the end of the illuminated strip. The beams make the angle of 14° to one another in the plane which passes through the longitudinal axis of the images.

Thus when the lighting device is in use with the strip of illumination located over the mouth of a dentist's patient, the incident beams are directed towards the sides of the patient's mouth.

To enable the strip of illumination from the lighting device to light the mouth and yet be clear of the patient's eyes, a sharp cut off at the edge of the strip of illumination is required. Gates 21 are therefore provided at the apparent positions of the other focus of the reflector 16. The gates are in the form of slits approximately ¼ inch wide with their longitudinal axes extending in the plane of the beam paths. To keep the edges of the gate in equal focus it is necessary to tilt the plate so that it lies nearly parallel to the concave mirror 18. To keep the illuminated strip of light of constant width it is necessary to taper the gate slightly so that they narrow towards their open end. The images of the filament formed at the apparent positions of the other focus of the reflector just fill the area of the slit. The gates cut out light reflected by the reflecting surfaces 17 directly from the lamp and other scattered light but the slits allow substantially the whole of the light which is reflected by the reflector 16 to pass through. Overlapping images of the gate are formed at the place where the beams meet by the mirrors 18 and lenses 19. Thus the gates do not significantly reduce the intensity of illumination but ensure a sharp cut-off at the edges of the strip.

The gates 21 and the reflecting surfaces 17 are provided on a bent metal piece 22. The piece 22 is secured to the housing 11 by two rivets 23 which have slotted heads to receive a screwdriver and eccentric middle portions 24. The middle portions are located in slots 25 in the piece 22 so that the rivets can be rotated to align the gates and reflecting surfaces with the mirrors 18.

The mirrors 18 are secured to the wall of the housing 11 and the lenses 19 are secured in apertures at the front of the housing. The reflector 16 is mounted in the housing by means of a plate 26. The housing has grilles 50 for ventilation. Alternatively the ventilation grilles may be moulded on the housing. Handles may be provided at the sides of the housing to facilitate adjustments.

The lamp 14 is secured using an epoxy-resin adhesive, in a hole in the side of a plastics-impregnated cardboard tube 27 so as to extend transversely from it. The tubes used for cores of transformer windings are suitable for this purpose. The lamp has a peripheral flange around its base which is a predetermined distance from its filament. Inside the tube 27 the terminals of the lamp 14 are connected by wires 28 to two pins 29 equidistant from the lamp at opposite ends of the tube. The pins 29 extend transversely of the tube in the same direction as the lamp. The pins are secured in holes in the wall of the tube by means of push-on clips and an epoxy-resin adhesive. At a predetermined distance from the tube there is a groove 30 running around the cylindrical surface of each pin.

Two sockets 31 are provided in the housing for receiving the pins 29. The sockets are in the form of tunnels open at both ends. One end is exposed to the outside of the housing the other end is on the inside of the housing. Channels 32 extending parallel to the sockets are open at their inner ends but closed apart from a narrow slit at their outer ends. A leaf spring 33 is located in each channel 32 and has one end of reduced width extending through the slit. The one end is bent over to secure the leaf spring in the channel and to provide a terminal. The other end is bent to form a catch. When the spring is unstressed, the catches lie opposite the inner end of their corresponding sockets. There is sufficient clearance between the walls of the channels and the leaf springs to allow the springs to make limited flexing movements and by flexing the springs, the catches can be moved clear of the ends of the sockets.

When the pins are inserted they extend beyond the inner ends of the socket. The catches are pushed aside by the ends of the pins and then engage the cylindrical surfaces of the pins under pressure from the springs. When the pins are fully inserted with abutment surfaces 51 around the bases of the pins against abutment surfaces around the outer ends of the sockets, the catches engage the grooves 30 to hold the pins in the sockets. The whole lamp assembly is thus precisely located relative to the housing. The lamp filament is arranged to be at a focus of the reflector by suitable location of the abutment surfaces of the sockets. Electricity is conducted to the lamp through the leaf springs and the pins. The ends of the leaf springs are connected to a supply of low voltage electricity through wires (not shown) which are fastened to the stirrup 13.

If the lamp 14 fails, the whole lamp assembly can readily be removed by gripping the tube 27 and pulling the pins from the sockets. This can be done whilst the lamp 14 is still hot as the tube is of thermally-insulating material. A replacement lamp assembly can be immediately inserted. By arranging that the distances between the filament and the abutment surfaces around the pins of the replcement assembly be the same as those of the original, the filament of the replacement will be located at the focus of the reflector 16 when the pins are fully inserted in the socket. Thus the long delays when a lamps fails, that are so inconvenient to a dentist with a patient under a general anaesthetic are avoided. For dentists who prefer to have two beams directed towards the top and bottom of their patients' mouths, a modified lighting device can be constructed in which the longitudinal axis of the lamp's filament lies perpendicular to the plane of the beam paths. In this case the beams make an angle of 14° to one another in the plane which passes transversely of the images. The slits of the gates are also normal to the plane of the beam paths.

Figure 3:
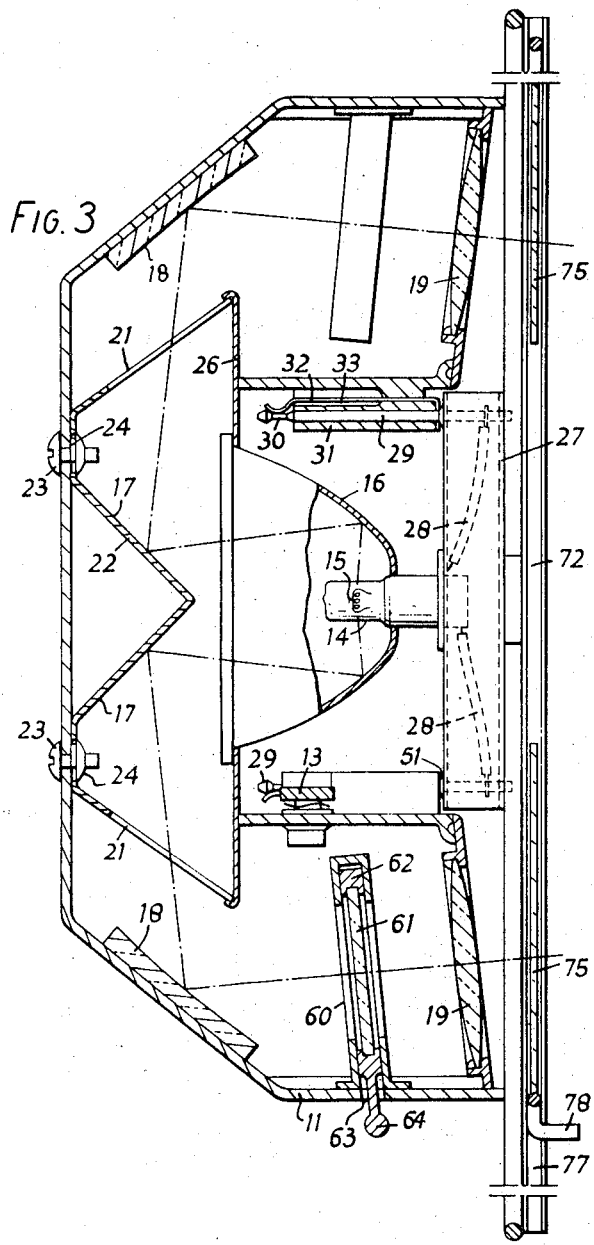
FIG. 3 shows a cross section of the lighting device of FIG. 1.

In the housing 11, between the concave mirrors 18 and their corresponding lenses 19 are provided two guide brackets 60 for locating colour temperature filters. In FIG. 3, only one of the brackets is holding a filter 61. The filter is mounted in a frame 62 and can be slid into and out of the bracket through an aperture 63 in the housing wall with the aid of a handle 64 provided on the frame.

With the colour temperature filter 61 located in the bracket the colour temperature of the light in the corresponding beam path is altered and consequently the colour temperatures of the two beams are different. With a given filter in the bracket it is possible to obtain light of three different colour temperatures. The filtered beam may be obstructed to provide lighting by the unfiltered light alone, the unfiltered beam may be obstructed to provide lighting by the filtered beam alone or neither beam may be obstructed to provide lighting by both beams together. The dentist can cause the obstruction by placing his hand in the beam and thus quickly match teeth in the three different lights.

In order to provide means for further varying the colour temperature a detachable slide assembly 70 may be fitted on the front of the lamp as shown in FIG. 3. The assembly 70 comprises a support 71 carrying at its top a bar 72 which is hooked over two hooks 73 at the top of the front of the lamp. A clip 74 at the bottom of the front of the lamp receives the lower part of the support to hold the slide assembly in position on the lamp. The slide assembly can be removed by unclipping the lower edge of the frame and unhooking the bar from the hooks.

Two wedge-shaped filters 75 are mounted in a frame 76 to form a slide which runs in upper and lower tracks 77 of the support. A handle 78 is provided on the frame to facilitate manual movement of the frame in the tracks. The filters are so mounted in the frames that corresponding positions on their leading edges 79 are separated by the same distance as the distance between the axes of the lenses 19. The filters 75 are colour temperature filters so that progressive movement of the slide in the track causes more of the filters to lie in the beam paths. Thus the colour temperature of the light source can be varied continuously.

Figure 1:
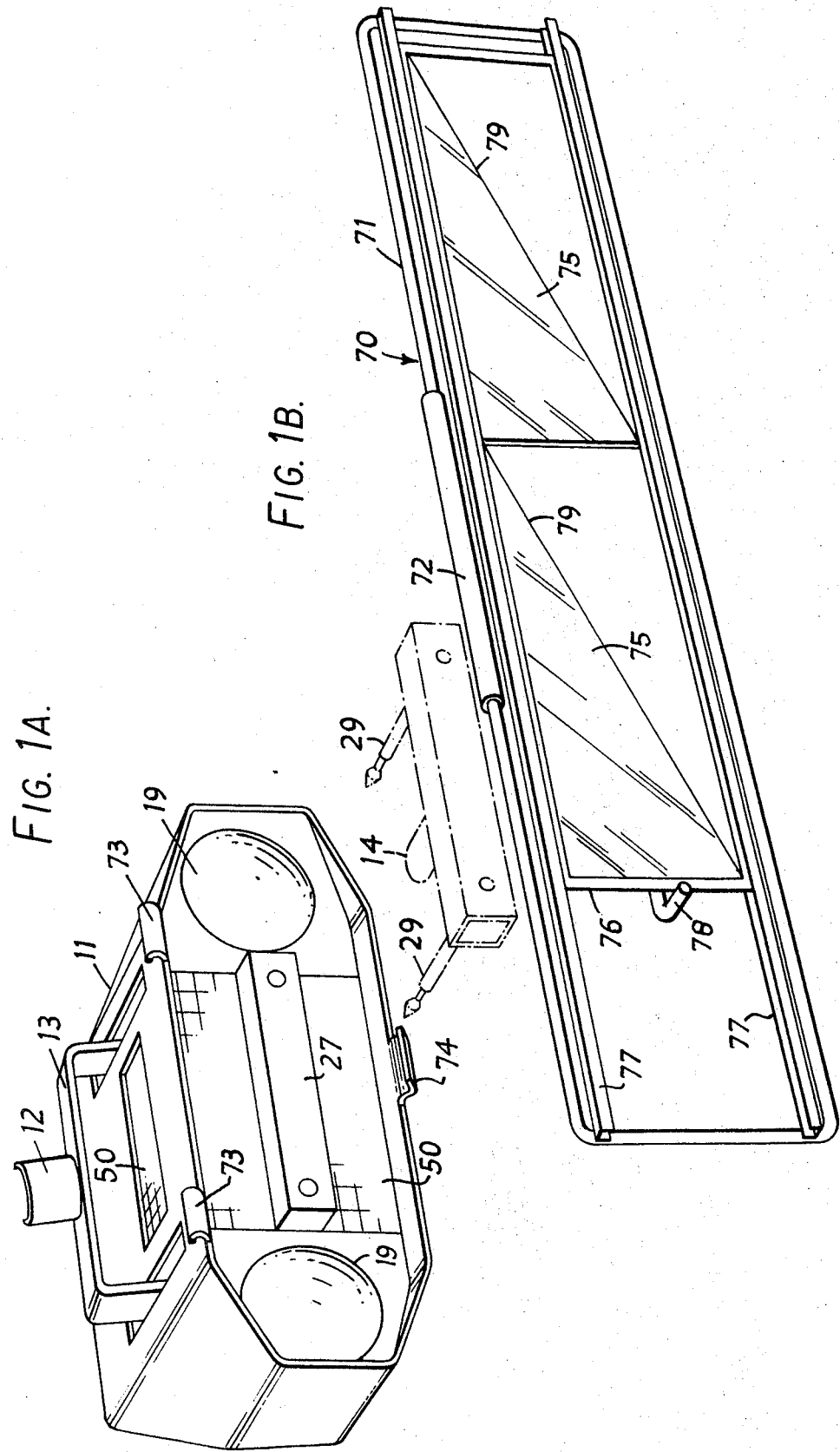
FIG. 1A shows a perspective view of a lighting device housing according to the invention for use in dentistry.

The lighting device of FIGS. 1 to 3 can be modified as follows to enable it to provide a source of light for a fibre optics system. One of the concave mirrors is carried by a hinge at its front edge to enable it to be moved out of the path of the beam. A spring biasses the mirror into its normal position in the beam. A hole is provided at the side of the housing to allow the end of a fibre optical cable to be inserted and directed towards the beam. In this position the end of the cable pushes the mirror out of the path of the beam.

In another embodiment the reflecting surfaces of the beam splitting device and the concave mirrors are made of dichroic material so as to reduce the heating effect of the light beam.

It is also possible to provide means for simultaneously tilting the concave mirrors and moving the lenses along the beam paths so as to vary the convergence of the two beams and thus vary the distance from the lighting device to the place where they meet and keep the images there in focus.

Figure 4:
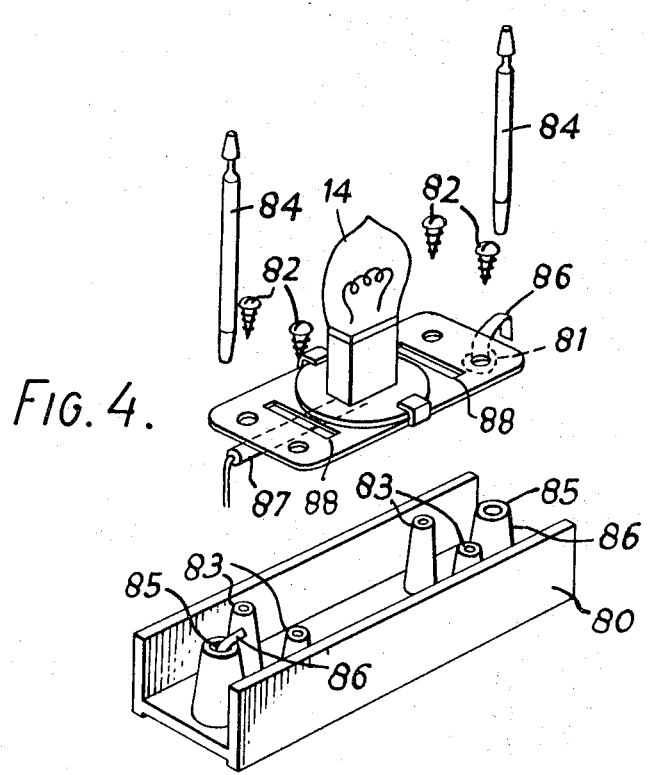
FIG. 4 shows an alternative form of lamp assembly.

FIG. 4 shows an alternative construction for the lamp assembly which is suitable for 12 volt lamps which operate at higher temperatures for which the plastics-impregnated cardboard tube might be unsafe.

The body 80 of the tube is moulded from a plastics material that will withstand high temperatures, such as glass-loaded nylon. The lamp 14 is mounted on a plate 81 of low thermal conductivity stainless steel to reduce the temperature which the plastics material must withstand. The plate 81 is secured to the body 80 by screws 82 which fit into pillars 83 on the body. Brass pins 84 for locating the lamp assembly in the housing are force fitted in holes 85 moulded on the body. To provide contacts 86 pieces of brass foil are trapped between the pins and their holes. A conduction 87 connected to the lamp is connected to one of the contacts 86 by soldering. The other contact is clamped between the underside of the plate and the top of one of the pillars 83 by one of the screws 82 to provide an electrical connection to the lamp. Slots or louvres 88 in the plate 81 interrupt the flow of heat to the screws and the plastics. The alternative lamp assembly of FIG. 4 is used in the same manner as the lamp assembly of FIGS. 2 and 3.

An alternative form of beam-splitting mirror and gates is shown in FIG. 5. The gates 90 are provided on a base plate 91. The beam-splitting mirrors 92 are provided on a separate piece of polished metal. The two pieces are secured together by tabs 93 which are passed through slots 94 and bent over. The assembly has greater rigidity and allows the base plate and gates to be blackened by dipping.

FIG. 6 shows an alternative form of stirrup. The stirrup comprises two brackets 95 of brass which are held together on the flexible column by a moulded plastics holder 96. Supply leads 97 passing through the column are connected to brackets 95. The stirrup is used with a housing of plastics material which is pivotally connected to the brackets by means of two bolts 98 (only one of which is shown in the drawing) which pass through holes in the brackets. Each bolt 98 is secured by nut 99 and a corrugated washer 100. A further corrugated washer 101 carrying an integral arm 102 is held between each nut 99 and the corresponding bracket. The arms 102 are soldered to the leaf springs 33 which engage the pins 29 or 84. An electrical circuit to the lamp is thus provided through the brackets 95, the bolts 98, the washers 101 and their arms 102, the springs 33 and the pins 29. The parts of the brackets 95 which lie outside the housing of the lamp are covered with a plastics coating 103 for insulation.

What I claim is:

1. A lighting device comprising a substantially elliptical reflector; a light source; means locating the light source at one of the foci of the reflector; a beam-splitting device disposed between the reflector and its other focus and adapted to split the light from the reflector into two beams, two primary images of the light source being formed by the elliptical reflector and the beam splitter; and an optical reflecting and focusing means for each said beam, each optical reflecting and focusing means being so positioned in the path of its respective beam to form a secondary image of the primary image of the light source on a common image plane, said optical reflecting and focusing means being disposed in positions causing said secondary images to overlap each other in said common image plane.

2. A device according to claim 1 in which each optical reflecting and focusing means comprises a concaved mirror and a converging lens.

3. A device according to claim 1 in which two gates are located in the paths of the beams between the beam splitting device and the two optical reflecting and focusing means respectively at or near the positions where images of the light source are in focus.

4. A device according to claim 3 wherein the light source comprises an elongate light source and the gates are in the form of slots of the same width as the image of the light source at the gate.

5. A device according to claim 3 wherein the light source comprises an elongate light source which extends transversely to the axis of the reflector and is normal to the plane of the beam paths, and the gates are in the form of slots which have their longitudinal axis normal to the plane of the beam paths.

6. A device according to claim 1 in which a filter which alters the colour and/or intensity of the light in the beam is arranged in one of the beam paths.

7. A device according to claim 6 in which the filter is mounted for movement across the beam path so that progressive movement of the filter causes more of the filter to lie in the beam.

8. A device according to claim 7 in which the leading edge of the filter is oblique to the direction of movement.

9. A device according to claim 6 in which each optical reflecting and focusing means comprises a concave mirror and a converging lens and the filter is located between one of the mirrors and the corresponding lens.

10. A device according to claim 1 in which guides are mounted in front of the optical systems and two wedge-shaped filters are mounted for sliding movement in the guides.

11. A device according to claim 1 in which the locating means is fitted with a lamp assembly comprising: a lamp which constitutes the light source; a tube of insulating material, the lamp being mounted on the tube and extending transversely from it; and two pins mounted on the tube and extending transversely from it in the same direction as the lamp the terminals of the lamp being connected to the two pins.

12. A device according to claim 11 in which the tube is of plastics impregnated card.

13. A device according to claim 11 in which the locating means comprises two sockets in which the pins are located.

14. A device according to claim 13 in which each socket is provided with a spring which engages the pin to hold it in the socket.

15. A device according to claim 14 including an abutment surface around the base of the pin; an abutment surface around the end of the socket and in which each pin has a groove running round its axial surface which cooperates with the corresponding spring to hold the pin in the socket with the abutment surface around the base of the pin engaging the abutment surface around the end of the socket.

16. A device according to claim 15 wherein the springs carry current to the lamp.

17. A lighting device comprising: a substantially elliptical reflector; a lamp with an elongate filament; a lamp holder adapted to locate the lamp with its filament at one of the foci of the reflector; a beam-splitting device disposed in front of the reflector and adapted to direct two beams of light transversely of the axis of the reflector in opposite directions, two intermediate focused images of the lamp being formed by the reflector and the beam splitter and two optical reflecting and focusing means located in the paths of the two beams respectively and positioned to reflect the beams into paths that meet at an acute angle to one another and form focused images of the intermediate images of the lamp in a plane where the beams overlap.

18. A lighting device comprising:
a substantially elliptical reflector;
a light source;
means locating said light source at one of the foci of the said reflector whereby to reflect the light from said lamp toward the other of said foci;
a beam-splitting device positioned to receive light from the reflector and split said received light from the reflector into a plurality of beams; and
an optical reflecting and focusing means for each said beam, each said optical reflecting and focusing means being positioned in the path of its respective beam to form a secondary image of a primary image of said light source on a common image plane, said primary image being formed by said elliptical reflector, said optical reflecting and focusing means being disposed in positions causing said secondary images to overlap each other in said common image plane.

19. A device according to claim 18 wherein each reflecting and focusing means includes a mirror.

20. A device according to claim 19 wherein the mirror is a concave mirror.

21. A device according to claim 20 wherein each reflecting and focusing means includes a converging lens.

22. A device according to claim 18 wherein gate means are located at the position of the primary image.

23. A device according to claim 18 wherein the elliptical reflector is a dichroic reflector.

24. A device according to claim 18 wherein the beam-splitting device is a dichroic reflector.

25. A device according to claim 20 wherein the concave mirror is a dichroic reflector.

26. A device according to claim 18 in which the locating means is fitted with a lamp assembly comprising: a lamp which constitutes the light source; an elongated supporting means of insulating material, the lamp being mounted on the supporting means and extending transversely from it; and two pins mounted on the supporting means and extending transversely from it in the same direction as the lamp, the terminals of the lamp being connected to the two pins.

27. A lighting device comprising:
  a light source;
  optical means forming two beams and two primary images of said source on opposite sides of said source,
  an optical reflecting and focusing means for each said beam, each said optical reflecting and focusing means being positioned in the path of its respective beam to form a secondary image of its respective primary image in a common image plane, said optical reflecting and focusing means being disposed in positions causing said secondary images to overlap each other in said common image plane.

* * * * *